Feb. 2, 1954  P. H. DANLY ET AL  2,667,954
AIR-COOLED PRESS BRAKE AND CLUTCH ASSEMBLY
Filed Oct. 27, 1949  2 Sheets-Sheet 1
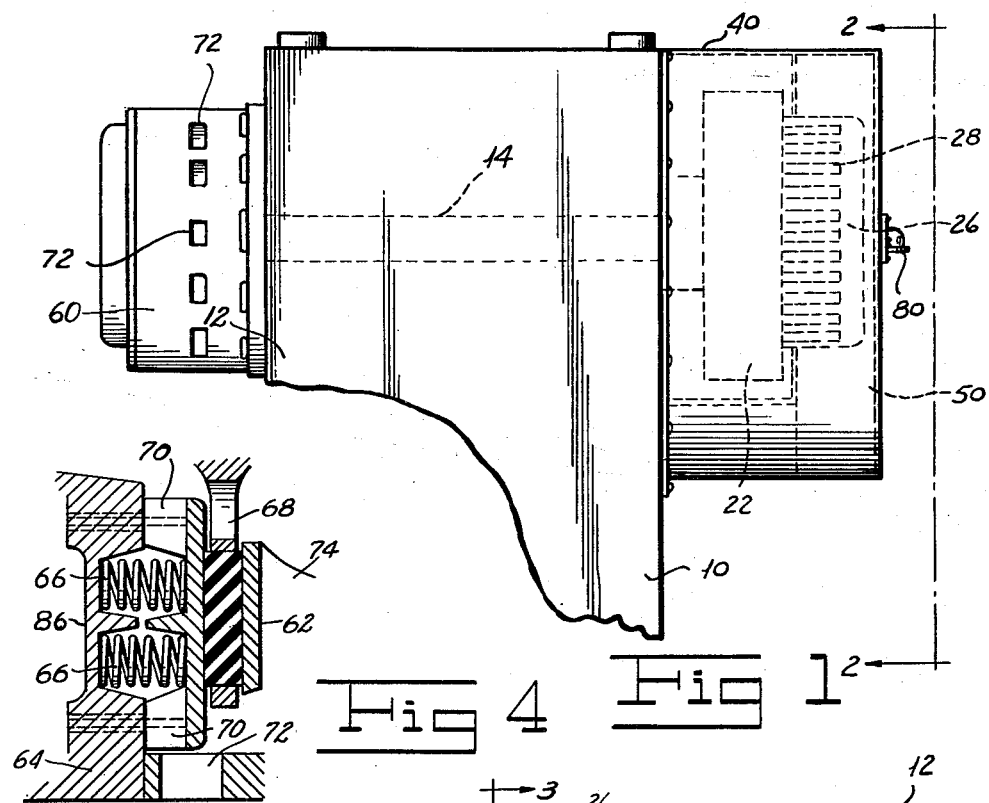
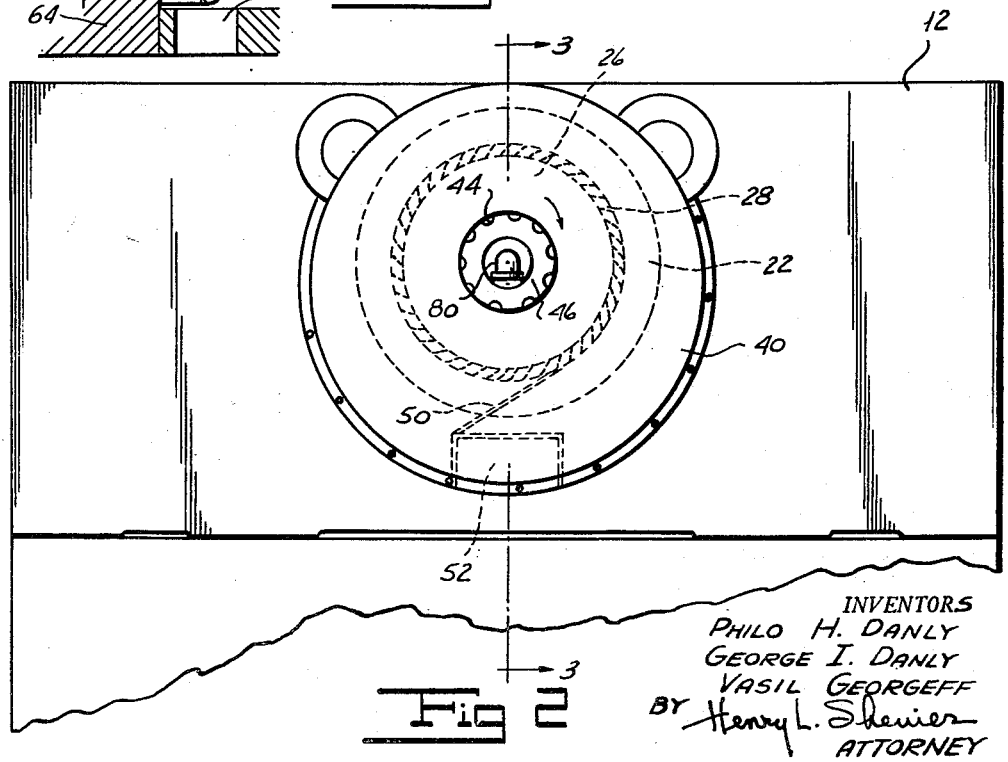
INVENTORS
PHILO H. DANLY
GEORGE I. DANLY
VASIL GEORGEFF
BY Henry L. Shevier
ATTORNEY

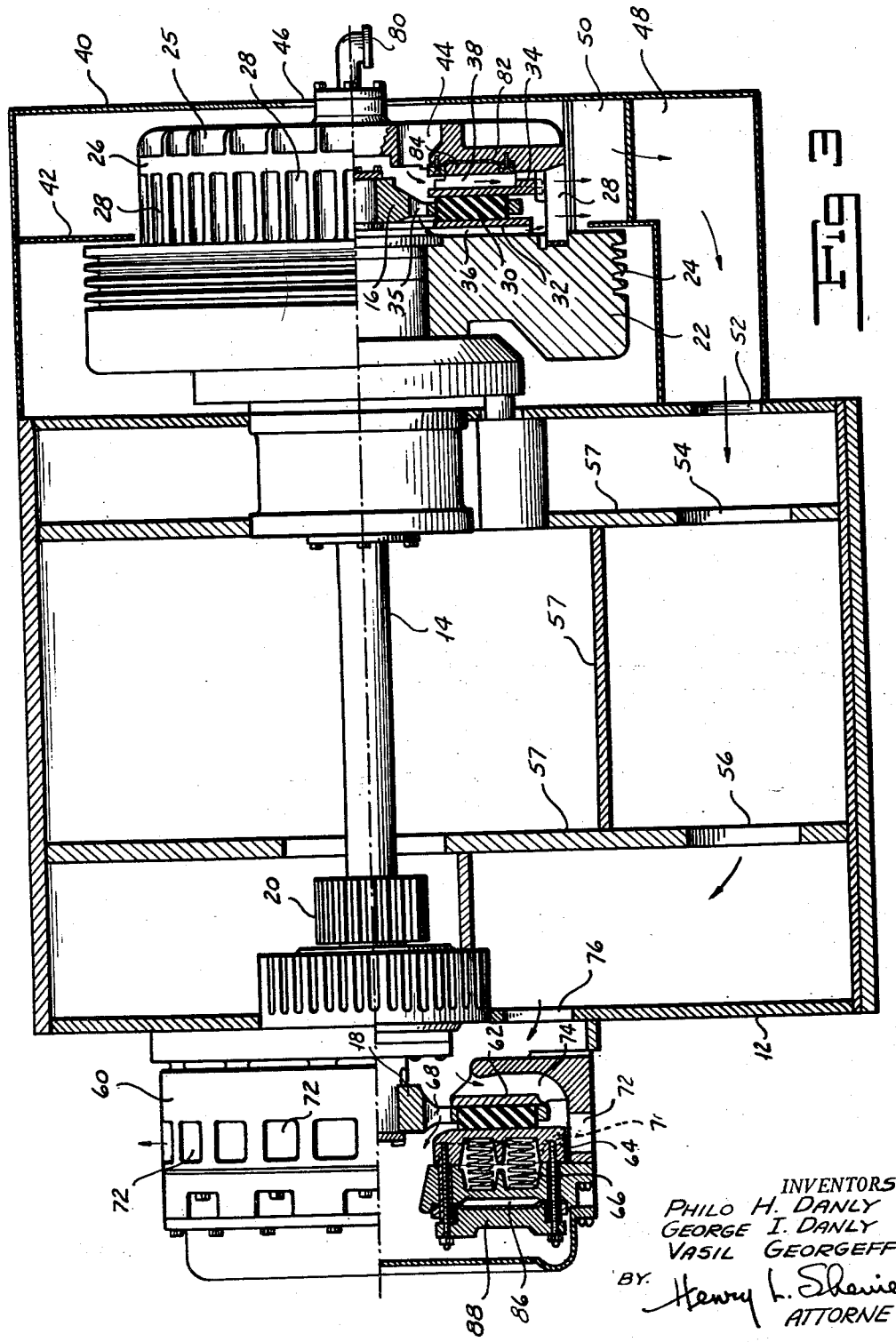

Patented Feb. 2, 1954

2,667,954

UNITED STATES PATENT OFFICE 2,667,954

AIR-COOLED PRESS BRAKE AND CLUTCH ASSEMBLY

Philo H. Danly, Hinsdale, George I. Danly, Elmhurst, and Vasil Georgeff, Chicago, Ill., assignors to The Danly Machine Specialties, Inc., Chicago, Ill., a corporation of Illinois Application October 27, 1949, Serial No. 123,952

9 Claims. (Cl. 192—18)

Our invention relates to air cooled press clutch and brake assemblies, and more particularly to an air cooled clutch and brake assembly for power presses in which the brake and clutch are continuously cooled by heat exchange with air continually passed in contact with the brake and clutch structures, and in which the brake and clutch structures are physically separated.

This application is an improvement over our copending application Serial No. 783,744 filed November 3, 1947, now Patent No. 2,584,190.

In our copending application a fan was placed intermediate a brake and clutch structure and air was drawn in from both sides through the brake and clutch structure and discharged by a centrifugal fan attached to the flywheel. For some constructions it is desirable that the brake structure and the clutch structure be separated from one another. For ease in maintenance it is desirable to mount the brake housing and its parts to the frame exteriorly thereof and likewise mount the flywheel carrying the clutch structure on the opposite side of the frame. In this manner if it becomes necessary to replace brake or clutch parts, one or the other of the two structures need not be disturbed. In this position they are accessible and can be maintained conveniently. The arrangement shown in our copending application can not be used.

In a power press the energy required per stroke is substantially the product of the average load and the working distance plus a friction allowance. In short stroke operations such as blanking the working energy is largely supplied from the kinetic energy stored in the flywheel and the motor serves merely to return the flywheel to speed during the large part of the cycle in which no work is done. In drawing operations, the working period is longer and in many cases the motor takes an increased part of the working load.

It is common practice in power presses to employ a continuously running motor driving a flywheel which is adapted to be clutched to and unclutched from the gear train driving an eccentric or crank. The arrangement is such that the ram and associated drive when unclutched from the flywheel are brought to rest and immobilized by a brake. At the start of the working stroke the brake is substantially simultaneously released and the clutch engaged. Since large amounts of energy must be handled the friction involved, especially in large presses, is high. This friction stops the press when the clutch is disengaged and the brake set. Friction engages the flywheel with the working train of the press when the clutch is again engaged. The result is that large amounts of heat are developed from the friction, both in the clutching operation and the braking operation. The heat which may frequently be considerable has a deleterious effect on the clutch and brake lining material which results in a rapid deterioration of the brake and clutch linings. Then, too, a heat resistant type of brake and clutch lining material must be used which results in a noisy operation. The use of a harder lining material requires increased clutch and brake surfaces as the coefficient of friction between the lining material and the coacting friction plates is less than in the case of a softer and more deformable lining material. This latter material gives a greater friction, smoother action and more quiet operation than the harder brake lining material. The softer material, however, is so susceptible to heat that it cannot ordinarily be successfully employed.

Then, too, the heat generated can be injurious to other parts of the clutch and brake. The metal plates which bear against the lining can become warped or pitted by the heat. The springs can lose some of their temper and worst of all, the piston packing in the air cylinder, whether it be leather, rubber or synthetic material, can become hardened or otherwise deteriorated by heat and become leaky to the point of rendering the clutch and brake inoperative.

As a consequence of the deterioration of brake linings as a result of heat much time is lost in pressing operations in replacing brake linings and other parts. This is especially burdensome if the press is part of a production line since the entire line is blocked by a press, the clutch and brake linings and other parts of which must be renewed.

One object of our invention is to provide an improved clutch and brake assembly in which the clutch and brake parts are physically separated and are continuously cooled by circulating air so that the heat generated by the clutching and braking operations will be constantly dissipated by the heat exchange, whereby the clutch and brake parts will operate at a lower temperature and by means of which high temperatures having a deleterious effect on the brake linings, clutch linings and other parts may be avoided.

Another object of our invention is to provide an improved air cooling system for a brake and clutch assembly which is simple and easy to install, efficient in operation and inexpensive in construction.

A further object of our invention is to provide an air cooling system for a clutch and brake assembly for power presses which may be used with various brake and clutch structures of varying construction without requiring changes in their mode of operation or construction.

Other and further objects of our invention will appear from the following description.

In the accompanying drawings which form part of the instant specification and which are to be read in conjunction therewith, and in which like reference numerals are used to indicate like parts in the various views:

Figure 1 is a side elevation of the crown of a power press having a brake structure disposed at one side of the press and a clutch structure disposed on the opposite side of the press, and containing one embodiment of our invention.

Figure 2 is a side elevation of the press shown in Figure 1 taken along the line 2—2 of Figure 1.

Figure 3 is a sectional elevation drawn on an enlarged scale taken along the line 3—3 of Figure 2.

Figure 4 is a fragmentary sectional view of a portion of the brake structure shown in Figure 3 showing the radial ducts through which cooling air is discharged to the atmosphere.

Referring now to the drawings, the press frame 10 may be of any desired construction, and is shown as a straight side press in which the upper portion 12 comprises the crown containing the working parts of the press comprising the transmission gear eccentrics to which the upper ends of the pitmans (not shown) are attached. The energy is transmitted to the press through a shaft 14 to which a clutch disk 16 and a brake disk 18 are secured for rotation therewith. The driving train (not shown) is driven through a pinion 20. Mounted for rotation concentric with the shaft 14 we provide a flywheel 22 driven through V-belts (not shown) operating in grooves 24 from any suitable prime mover such as an electric motor (not shown). Secured to the flywheel 22 for rotation therewith we provide a clutch housing 26 which is formed with a plurality of centrifugal fan buckets 28 and with a plurality of heat exchange fins 25. The flywheel rotates constantly so that the fan composed of blades 28 formed in its housing will likewise rotate constantly. The clutch disk 16 carries a plurality of friction blocks 30 adapted to be clamped between an axially stationary clutch plate 32 and an axially movable clutch plate 34. The clutch plates 32 and 34 are provided with a plurality of radially directed air passageways 36 and 38. The flywheel and the clutch housing are surrounded by a sheet metal casing 40, the interior of which is provided with an annular baffle 42 adapted to direct the air discharged by the centrifugal fan buckets 28. A plurality of openings 44 are provided in the clutch housing and communicate with an opening 46 formed in the casing 40. The centrifugal fan is adapted to draw air through the opening 46 whence it will pass through the openings 44 and be discharged through the ducts 38 and 36 into the space 48 within the casing 40. A plurality of openings 35 are provided in the clutch disk 16 so that air may pass to the ducts 36 formed in the axially stationary clutch plate 32. The passage of air just described will cool the clutch structure. An inclined collecting baffle 50 directs the air to the opening 52 in the crown structure for passage through the crown through appropriate openings 54 and 56 formed in the framework 57 within the crown. This baffle 50 further prevents the air discharged by the fan buckets 28 from whirling.

The other side of the press frame carries a brake housing 60 formed with a stationary brake plate 62 and an axially movable brake plate 64 normally set by springs 66. The brake disk 18 is formed with a plurality of openings 68 adapted to permit the passage of air through the brake disk. The axially movable brake plate 64 is provided with a plurality of radially disposed passageways 70 communicating with a number of peripherally placed air outlet openings 72, as can be seen by reference to Figure 4. The stationary brake plate 62 is provided with a plurality of similar radially disposed passageways 74 communicating with the openings 72. Air from the crown discharged by the flywheel fan passes through openings 76 formed in the side plates of the crown structure for passage through the radial ducts 74 and 70 to cool the press parts and is then discharged under the pressure of the air being discharged by the fan to the atmosphere.

The clutch is normally disengaged by spring (not shown). The brake is normally set by springs 66. Any suitable means such as fluid pressure introduced through pipe 80 is adapted to introduce fluid to the cylinder 82 formed in the clutch housing to move the annular piston 84 to the left to set the clutch as is well known to the art.

Similarly, fluid under pressure is adapted to be introduced to the annular cylinder 86 of the brake structure to move the annular piston 88 to the left moving the axially movable brake plate to the left against the action of the springs 66 to release the brake. The arrangement is such that the brake is released while the clutch is being set and the brake is set while the clutch is being released.

Since the flywheel is rotating constantly the brake and clutch structures will be constantly cooled whether the clutch is engaged or not.

It will be seen that we have accomplished the objects of our invention. We have provided a clutch and brake assembly which is continuously air cooled and in which the brake and clutch are physically separated from each other. We have found that in tests under artificially rigorous conditions, beyond those met in actual use, we have been enabled to maintain a reduced temperature of both the brake and clutch components below a temperature at which the brake linings are seriously affected. By means of our assembly we can increase the life of the brake and clutch linings. Furthermore, we are enabled to use a more deformable material for the brake and clutch linings making for smoother operation of the assembly. Our cooling structure is and may be adapted to brakes or clutches of various designs without influencing their mechanical structure.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A clutch and brake assembly for power presses including in combination a press frame, a brake housing carried by the frame outboard on one side thereof, a shaft, a brake disk secured to the shaft, brake plates positioned in the brake housing adapted to immobilize the brake disk and the shaft, a continually rotating flywheel positioned outboard of the press frame on the other side thereof, a clutch housing, means for continually rotating the clutch housing from the flywheel, a clutch disk secured to the shaft and positioned within the clutch housing, clutch plates carried by the clutch housing adapted to engage the clutch disk to rotate the shaft upon release of the brake, a centrifugal fan carried by the flywheel, a stationary casing surrounding the fan and carried by the frame, a passageway providing communication between the atmosphere and the intake of the fan, heat exchange means carried by the clutch plates positioned in said passageway, a communicating duct between the fan casing and the brake housing, said brake housing being formed with air discharge openings, and heat exchange means by the brake plates adapted to be cooled by the air introduced into the brake housing from said communicating duct.

2. A clutch and brake assembly as in claim 1 in which said means for continually rotating the clutch housing comprises means for securing the clutch housing to said flywheel for rotation therewith.

3. A clutch and brake assembly as in claim 1 in which said clutch housing is carried by said flywheel for rotation therewith, and said centrifugal fan comprises buckets formed in said clutch housing extending around a locus adjacent the outer periphery of the flywheel.

4. A clutch and brake assembly as in claim 1 in which said passageway is formed in part by radially extending ducts formed in the clutch plates, said ducts comprising heat exchange means.

5. A clutch and brake assembly as in claim 1 in which said clutch housing is provided with heat exchange fins exteriorly thereof.

6. A clutch and brake assembly as in claim 1 in which said fan casing is provided with an antiwhirling baffle positioned interiorly thereof.

7. A clutch and brake assembly as in claim 1 in which said brake housing is carried by the crown of a press, said fan casing is carried by the crown of the press exteriorly thereof and positioned on the opposite side of the press, and said communicating duct is formed in part by the interior of the crown of the press.

8. In a clutch and brake assembly as in claim 1, a shroud for said fan casing, said shroud disposed adjacent the flywheel and adjacent the discharge openings of the centrifugal fan interiorly of said casing.

9. A clutch and brake assembly as in claim 1 in which said heat exchange means carried by the brake plates includes passageways between the interior of the brake housing and said air discharge openings.

PHILO H. DANLY.
GEORGE I. DANLY.
VASIL GEORGEFF.

References Cited in the file of this patent
UNITED STATES PATENTS

| Number | Name | Date |
|---|---|---|
| 1,573,324 | Norris | Feb. 16, 1926 |
| 2,108,059 | Glasner | Feb. 15, 1938 |
| 2,221,014 | Williamson | Nov. 12, 1940 |
| 2,441,543 | Longfield | May 11, 1948 |